United States Patent [19]

Rosenquist

[11] Patent Number: 4,728,691

[45] Date of Patent: Mar. 1, 1988

[54] COMPOSITION AND PROCESS FOR POLYMERIZING AROMATIC CYCLIC CARBONATE OLIGOMERS ADMIXED WITH CARBON MATERIALS

[75] Inventor: Niles R. Rosenquist, Evansville, Ind.

[73] Assignee: General Electric Company, Mt. Vernon, Ind.

[21] Appl. No.: 940,306

[22] Filed: Dec. 9, 1986

[51] Int. Cl.$^4$ .......................... C08K 3/04; C08L 69/00
[52] U.S. Cl. .................................... 524/847; 252/507; 252/511; 524/876; 524/907; 528/196; 528/198; 528/200; 528/371
[58] Field of Search ............... 524/847, 876, 495, 599, 524/611, 907; 252/511, 510; 528/196, 198, 200, 371

[56] References Cited

U.S. PATENT DOCUMENTS 4,255,557  3/1981  Megumi et al. ............... 528/196
4,644,053  2/1987  Brunelle et al. ............... 528/371

*Primary Examiner*—Theodore E. Pertilla
*Attorney, Agent, or Firm*—Martin B. Barancik

[57] ABSTRACT

A method for producing a high molecular weight polycarbonate admixed with carbon materials which comprises
(a) adding a polymerizing effective amount of an acidic metallic catalyst system to aromatic cyclic carbonate oligomers admixed with a carbon material, and
(b) polymerizing the mixture of carbon material and aromatic cyclic carbonate oligomers to a high molecular weight aromatic polycarbonate.

17 Claims, No Drawings

COMPOSITION AND PROCESS FOR POLYMERIZING AROMATIC CYCLIC CARBONATE OLIGOMERS ADMIXED WITH CARBON MATERIALS

BACKGROUND OF THE INVENTION

Recently there has been significant focus on the preparation of various polymers from their oligomeric structures. Generally the oligomeric structures have better flow properties than the final polymer and therefore can be used to make various articles where the initial flow is a significant feature of the article. For example, in composite formation the flow of the oligomer is a significant feature in filling the mold and wetting the reinforcing material.

The use of cyclic carbonate oligomers for preparing polycarbonate is a good example of the current focus. By using mixtures of cyclic carbonate oligomers, the softening point of the oligomers is of a sufficiently low temperature that various commercial uses of the cyclic carbonate oligomers are now possible. These uses particularly include the preparation of high molecular weight polycarbonate composite materials. These materials can be used in various applications wherein the general strength and toughness of the polycarbonate is added to by the reinforcing material so that an extremely high modulus is also achieved. The typical method of preparing the polycarbonate composite is to prepare the cyclic carbonate oligomers, add a polymerization catalyst or initiator to the oligomers, add the oligomers to a specific reinforcing material, and raise the temperature to set off the polymerization catalyst or initiator so as to form the high molecular weight polycarbonate resin composite.

This particular method has been found to work well with various fillers such as glass fibers, flakes, aramid fibers and the like. However, with the presence of carbon black together with the cyclic carbonate oligomers, certain problems have occurred in our laboratory. Utilizing a typical catalyst, the predicted linear polymer buildup has not occurred when carbon black has been present with the cyclic carbonate oligomers. Rather, a low intrinsic viscosity has been achieved demonstrating that high molecular weight polycarbonate has not been made. A new catalyst family usually not associated with aromatic polycarbonates has been found to convert cyclic carbonate oligomers to high molecular weight aromatic polycarbonates in the presence of carbon black.

SUMMARY OF THE INVENTION

A method for producing a high molecular weight polycarbonate admixed with carbon materials which comprises (a) adding a polymerizing effective amount of an acidic metallic catalyst system to aromatic cyclic carbonate oligomers admixed with carbon materials, and (b) polymerizing the mixture of carbon material and aromatic cyclic carbonate oligomers to a high molecular weight aromatic polycarbonate.

A further aspect of the invention is the composition of aromatic cyclic carbonate oligomers admixed with a carbon material and a polymerizing effective amount of an acidic metallic catalyst system.

DETAILED DESCRIPTION OF THE INVENTION

The mixture of aromatic cyclic carbonate oligomers useful in this invention are well described in EP patent specification No. 162379, laid open on Nov. 27, 1985, to General Electric Company and incorporated by reference. The amount of linear oligomer or high molecular weight polycarbonate which may also be present with the aromatic cyclic carbonate oligomers is not critical to the invention.

As is readily apparent, any diphenol which results in an aromatic polycarbonate under appropriate reaction conditions can be employed to prepare the mixture of cyclic carbonate oligomers. Dihydric phenols useful to make the mixture of cyclic carbonate oligomers include those of the formula

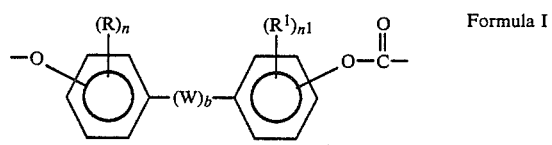

Formula I wherein:
R and $R^1$ are independently selected from monovalent hydrocarbon radicals, monovalent hydrocarbonoxy radicals, and halogen radicals;
W is selected from divalent hydrocarbon radicals,

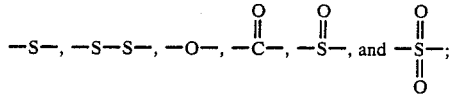

n and $n^1$ are independently selected from integers having a value of from 0 to 4 inclusive;
and b is either zero or one.

The monovalent hydrocarbon radicals represented by R and $R^1$ include the alkyl, cycloalkyl, aryl, aralkyl and alkaryl radicals. The preferred alkyl radicals are those containing from 1 to about 12 carbon atoms. The preferred cycloalkyl radicals are those containing from about 4 to about 8 ring carbon atoms. The preferred aryl radicals are those containing from 6 to 12 ring carbon atoms, i.e., phenyl, biphenyl, and naphthyl. The preferred aralkyl and alkaryl radicals are those containing from 7 to about 14 carbon atoms.

The preferred halogen radicals represented by R and $R^1$ are chlorine and bromine.

The monovalent hydrocarbonoxy radicals represented by R and $R^1$ may be represented by the formula $-OR^2$ wherein $R^2$ is a monovalent hydrocarbon radical of the type described hereinafore. Preferred hydrocarbonoxy radicals are the alkoxy and aryloxy radicals.

The divalent hydrocarbon radicals represented by W include the alkylene, alkylidene, cycloalkylene, and cycloalkylidene radicals. The preferred alkylene radicals are those containing from 2 to about 20 carbon atoms. The preferred alkylidene radicals are those containing from 1 to about 20 carbon atoms. The preferred cycloalkylene and cycloalkylidene radicals are those containing from 6 to about 16 ring carbon atoms.

Some illustrative non-limiting examples of dihydric phenols falling within the scope of Formula I include:
2,2-bis(4-hydroxyphenyl)propane (bisphenol-A);
2,2-bis(3,5-dibromo-4-hydroxyphenyl)propane;

2,2-bis(3,5-dimethyl-4-hydroxyphenyl)propane;
2,2-bis(3-bromo-5-methyl-4-hydroxyphenyl)propane;
1,1-bis(4-hydroxyphenyl)cyclohexane;
1,1-bis(4-hydroxyphenyl)cyclododecane;
1,1-bis(3,5-dimethyl-4-hydroxyphenyl)cyclododecane;
1,1-bis(4-hydroxyphenyl)decane;
1,4-bis(4-hydroxyphenyl)butane;
bis(4-hydroxyphenyl)methane;
4,4'-thiodiphenol; and
bis(4-hydroxyphenyl)ether.

Other dihydric phenols which are useful are described in U.S. Pat. Nos. 2,998,835; 3,028,365 and 3,335,154, all of which are incorporated herein by reference.

The method of preparing the mixture of aromatic cyclic carbonate oligomers is not critical to the invention and is well described in the aforementioned application incorporated by reference, EP No. 162379. It should be noted that a mixture of cyclic carbonate oligomers includes the same dihydric phenol wherein there is more than a single repeat number as well as a mixture of oligomers made from different dihydric phenols or even a co-cyclic carbonate oligomer having different repeat numbers and different amounts of the various dihydric phenols in the oligomer.

Once prepared the mixture of aromatic cyclic carbonate oligomers is then contacted with the carbon material. The carbon material may be in any form which provides a black color to the final aromatic polycarbonate composition, prepares a conducting aromatic polycarbonate composition, or reinforces the final aromatic polycarbonate composition in the terms of modulus. Therefore the carbon material can be in the form of powder, granules, fibers, mats, strands, whiskers, and the like. The quantity of carbon material which is necessary to accomplish these goals can be anywhere from about 0.2 weight percent of the aromatic polycarbonate composition to about 30 weight percent. When using the carbon powder or granules, usually referred to as "carbon black" to make a black or electrically conducting material, the carbon can be mixed with an organic material which also is a solvent for the aromatic cyclic carbonate oligomers such as methylene chloride or 1,2 ethylenedichloride. After thorough mixing and preparation of the carbon slurry, the aromatic cyclic carbonate oligomers is added therein, followed by a polymerizing effective amount of an acidic metallic catalyst system. When using carbon in the form of reinforcing materials such as fibers, mats, whiskers and the like, the reinforcing material can be mixed in the dry form with the aromatic cyclic carbonate oligomers to which the acidic metallic catalyst system has been added.

The acidic metallic catalyst systems which can be used in this invention include the "Tyzor" family of catalysts offered by DuPont and other metallic catalyst systems. The Tyzor catalysts are usually titanium complexed with certain organic groups such as the alkoxy substituents. For example, tetraoctyl titanate is an effective catalyst system for conversion of the carbon containing aromatic cyclic carbonate oligomer system to the carbon containing high molecular weight aromatic polycarbonate system. Further examples of acidic metallic catalyst systems which can be employed in this invention include those based on aluminum, tin and antimony complexd with various organic ligands. As used in this specification and claims, the term "catalyst system" includes both the initial catalyst species added to the formulation and catalytically active species to which it may be converted, by for example ligand exchange reactions, during the polymerization process.

The quantity may be any quantity which provides high molecular weight polycarbonate. A quantity of catalyst necessary to cause conversion of the cyclic oligomers to high molecular weight polycarbonte resin is required. Generally the specific quantity of catalyst needed is dependent on the exact nature of the catalyst species in that catalyst reactivity is dependent on the nature of the metal ion and the nature of the organic groups complexed to it. Other experimental variables such as reaction time and temperature will also affect the level of catalyst required. As an example, in molding carried out to a maximum of 240° to 300° C. using tetraoctyltitanate as a catalyst, the preferred quantity of catalyst is 0.025 to 0.15 mole % with the most preferred quantity being 0.05 to 0.1 mole %. Mole % is defined as the ratio of moles of catalyst system present to moles of oligomer repeat units present times 100. The term high molecular weight aromatic polycarbonate refers to a polycarbonate whose intrinsic viscosity at 25° C. in methylene chloride is above at least about 0.40, preferably above about 0.50.

Other additives may be present in the composition such as various other inert fillers, ultraviolet stabilizers, thermal stabilizers, flame retardant additives, and the like.

Below are examples of the invention. These examples are set forth to illustrate the scope and nature of the invention rather than narrow the invention.

PREPARATION 1

Preparation of admixture of carbon black powder and aromatic bisphenol-A cyclic carbonate oligomers in methylene chloride. 25 gms of carbon black (Black Pearls 2000, Cabot Corporation) was added to 625 g of methylene chloride. The resulting admixture was stirred in a Waring blender for about 30–45 minutes, at which time the admixture had become more homogenous as evidenced by a smooth, uniform appearance and the absence of larger granules of carbon which had been present at the start of the mixing process. 225 gms of bisphenol-A cyclic carbonate oligomers of weight average molecular weight 1100, number average molecular weight 900 and intrinsic viscosity 0.101 was then added to the slurry and stirred. The slurry was weighed to determine the quantity of methylene chloride lost by volatilization during mixing and sufficient methylene chloride added to correct for it.

EXAMPLE 1

To each of three 48.3 gm portions of the slurry, each one containing 12.4 gms (0.05 mole) of cyclic bisphenol-A carbonate oligomer and 1.4 g (10 wt. % of solids) of carbon black was added 0.1 mole % of a specific catalyst system illustrated below. Each of the three samples was well shaken and the solvent removed on a rotary evaporator. 5 gram samples of the solid residue from each were then dried and heated under pressure in a compression mold to 240° C. (A heating cycle of about 30 minutes was required for each room temperature to 240° C. molding). For examples A and B the resultant sample was too brittle to be removed from the mold without breaking apart into small pieces. For example C, an intact, tough disk, was removed from the mold. Samples of each were dissolved in methylene chloride, filtered and the intrinsic viscosity of each was measured at 25° C. in methylene chloride. Below are the results:

TABLE 1

| EXAMPLE | CATALYST | QUANTITY OF CATALYST ADDED TO 0.05 MOLE OF OLIGOMERS | I.V. |
|---|---|---|---|
| A | Tetrabutyl ammonium tetraphenyl borate | 0.028 grams | 0.109 |
| B | Lithium Stearate | 0.0145 grams | 0.105 |
| C | Tetraoctyl titanate (TOT) | 120 ul of a 1/3 ratio of TOT/CH$_3$OH | 0.719 |

As can be appreciated from the results, the examples of the basic catalyst systems, A and B could not bring about high molecular weight aromatic polycarbonate when carbon black was present. However the acidic catalyst system of sample C catalyzed the propagation of a high molecular weight aromatic polycarbonate in the presence of the carbon black material.

What is claimed is:

1. A method for producing a high molecular weight polycarbonate admixed with carbon materials which comprises
   (a) adding a polymerizing effective amount of an acidic metallic catalyst system to aromatic cyclic carbonate oligomers admixed with a carbon material, and
   (b) polymerizing the mixture of carbon material and aromatic cyclic carbonate oligomers to a high molecular weight aromatic polycarbonate.

2. The process in accordance with claim 1 wherein the carbon is in the physical form of the group consisting of powder, granule, fiber, flake, mat, strand or whisker.

3. The process in accordance with claim 2 wherein the carbon is in the form of powder or granules.

4. The process in accordance with claim 3 wherein the carbon is from about 0.2 to 30 weight percent of the polycarbonate plus carbon.

5. The process in accordance with claim 1 wherein the acidic metallic catalyst system has a transition metal.

6. The process in accordance with claim 5 wherein the transition metal is titanium.

7. The process in accordance with claim 6 wherein the catalyst system is tetraoctyltitanate.

8. The process in accordance with claim 1 wherein the minimum intrinsic viscosity at 25° C. in methylene chloride of the high molecular weight polycarbonate is about 0.40.

9. The process in accordance with claim 1 wherein the oligomers are bisphenol-A cyclic carbonate oligomers.

10. A composition of aromatic cyclic carbonate oligomers admixed with a carbon material and a polymerizing effective amount of an acidic metallic catalyst system.

11. The composition in accordance with claim 10 wherein the carbon is in the physcial form of the group consisting of powder, granule, fiber, flake, mat, strand or whisker.

12. The composition in accordance with claim 11 wherein the carbon is in the form of powder or granules.

13. The composition in accordance with claim 12 wherein the carbon is from about 0.2 to 30 weight percent of the polycarbonate plus carbon.

14. The composition in accordance with claim 10 wherein the acidic metallic catalyst system has a transition metal.

15. The composition in accordance with claim 14 wherein the transition metal is titanium.

16. The composition in accordance with claim 15 wherein the catalyst system is tetraoctyltitanate.

17. The composition in accordance with claim 10 wherein the oligomers are bisphenol-A cyclic carbonate oligomers.

* * * * *